(12) United States Patent
Chen et al.

(10) Patent No.: US 12,298,261 B2
(45) Date of Patent: May 13, 2025

(54) BACKSCATTER IMAGING DEVICE, CONTROL METHOD AND INSPECTION SYSTEM

(71) Applicant: NUCTECH COMPANY LIMITED, Beijing (CN)

(72) Inventors: Zhiqiang Chen, Beijing (CN); Yuanjing Li, Beijing (CN); Shangmin Sun, Beijing (CN); Chunguang Zong, Beijing (CN); Yu Hu, Beijing (CN); Huaping Tang, Beijing (CN); Bicheng Liu, Beijing (CN); Weizhen Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 184 days.

(21) Appl. No.: 18/013,555

(22) PCT Filed: Jul. 2, 2021

(86) PCT No.: PCT/CN2021/104165
§ 371 (c)(1),
(2) Date: Dec. 29, 2022

(87) PCT Pub. No.: WO2022/017155
PCT Pub. Date: Jan. 27, 2022

(65) Prior Publication Data
US 2023/0288350 A1    Sep. 14, 2023

(30) Foreign Application Priority Data
Jul. 22, 2020   (CN) .......................... 202010711982.0

(51) Int. Cl.
*G01N 23/203* (2006.01)

(52) U.S. Cl.
CPC ..... *G01N 23/203* (2013.01); *G01N 2223/316* (2013.01); *G01N 2223/3301* (2013.01); *G01N 2223/501* (2013.01)

(58) Field of Classification Search
None
See application file for complete search history.

(56) References Cited

U.S. PATENT DOCUMENTS

| 5,999,836 A | 12/1999 | Nelson et al. |
| 6,624,431 B1 | 9/2003 | Foster et al. |

(Continued)

FOREIGN PATENT DOCUMENTS

| CN | 1343883 A | 4/2002 |
| CN | 1646894 A | 7/2005 |

(Continued)

OTHER PUBLICATIONS

First OA mailed Jun. 15, 2022 for CN App No. 202010711982.0.

(Continued)

*Primary Examiner* — Hoon K Song

(57) ABSTRACT

The present invention relates to a backscatter imaging device, a control method and an inspection system. The backscatter imaging device includes a ray source assembly configured to emit rays to a scanning area; a backscatter detector array including a plurality of backscattering detectors and configured to receive scattered photons when the rays are backscattered by an object within the scanning area; and a first collimator assembly including a plurality of first collimating channels corresponding to the plurality of backscatter detectors respectively, arranged on one side of the backscatter detector array adjacent to the scanning area, and configured to align the scattered photons when the rays are backscattered by the object, and the plurality of backscatter detectors receive scattered photons corresponding to a plurality of depths in the object respectively; and at least part of (Continued)

the plurality of first collimation channels have an adjustable collimation angle.

15 Claims, 4 Drawing Sheets

(56) References Cited

U.S. PATENT DOCUMENTS

| | | | |
|---|---|---|---|
| 10,240,451 B2 | 3/2019 | Lee et al. | |
| 10,393,917 B2 | 8/2019 | Hu et al. | |
| 2002/0011571 A1 | 1/2002 | Lin et al. | |
| 2004/0086078 A1 | 5/2004 | Adams et al. | |
| 2010/0260317 A1* | 10/2010 | Chang | A61N 5/103 378/65 |
| 2010/0303200 A1 | 12/2010 | Kimchy et al. | |
| 2012/0002788 A1 | 1/2012 | Yang et al. | |
| 2013/0315368 A1* | 11/2013 | Turner | G01N 23/203 378/87 |
| 2015/0340201 A1 | 11/2015 | Wu et al. | |
| 2015/0377803 A1 | 12/2015 | Turner | |
| 2016/0003965 A1* | 1/2016 | Chen | G01V 5/222 378/87 |

FOREIGN PATENT DOCUMENTS

| | | |
|---|---|---|
| CN | 101113961 A | 1/2008 |
| CN | 101501477 A | 8/2009 |
| CN | 101571496 A | 11/2009 |
| CN | 101592623 A | 12/2009 |
| CN | 102023169 A | 4/2011 |
| CN | 202092973 U | 12/2011 |
| CN | 202305446 U | 7/2012 |
| CN | 102854208 A | 1/2013 |
| CN | 102914555 A | 2/2013 |
| CN | 203829493 U | 9/2014 |
| CN | 104133251 A | 11/2014 |
| CN | 105078485 A | 11/2015 |
| CN | 106901771 A | 6/2017 |
| CN | 109671513 A | 4/2019 |
| CN | 106896121 B | 7/2019 |
| WO | 2006122244 A2 | 11/2006 |

OTHER PUBLICATIONS

Notice of Granting Invention Patent Right mailed Dec. 21, 2021 for CN App No. 202010711982.0.
Li Weijiao et al., Design of the X-ray backscatter array detector based on SiPM; published May 31, 2016, 8 pages.
Wang Zhentao et al., The Monte Carlo simulation of Compton back-scattering imaging system with detector array; published Nov. 30, 2006, 4 pages.
ISR mailed Sep. 21, 2016 for PCT No. PCT/CN2021/104165.
The extended European search report received in the counterpart European application 21846442.8, mailed on Jun. 27, 2024, 8 pages.

* cited by examiner

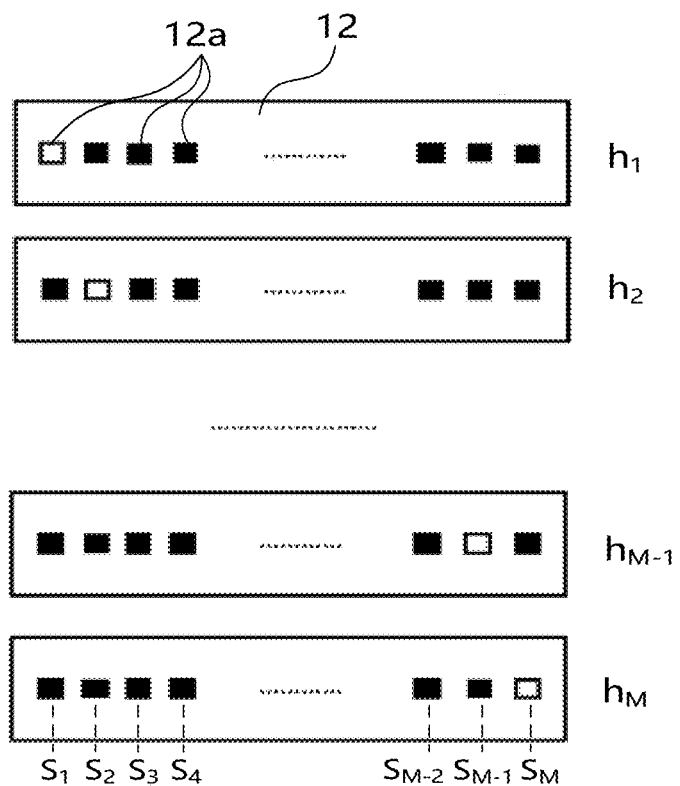
Fig. 7
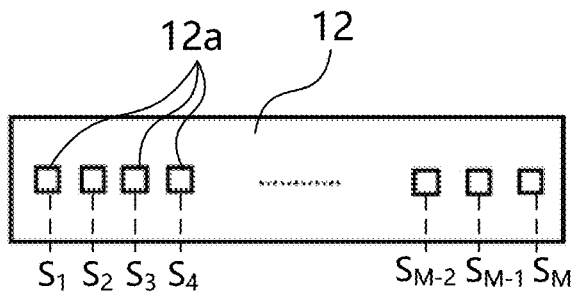
Fig. 8
```
causing a ray source assembly to emit
       rays to a scanning area                — 100
adjusting a collimation angle of at
  least part of a plurality of first
   collimating channels in a first
 collimator assembly when an object            — 200
  enters the scanning area and moves
    relative to the scanning area
```
Fig. 9

BACKSCATTER IMAGING DEVICE, CONTROL METHOD AND INSPECTION SYSTEM

CROSS-REFERENCES TO RELATED APPLICATIONS

The present disclosure is a national phase application of International Application No. PCT/CN2021/104165, filed on Jul. 2, 2021, which claims priority to CN Patent Application No. 202010711982.0 filed on Jul. 22, 2020, the entireties of which are herein incorporated by reference.

FIELD

The present disclosure relates to backscatter imaging technology, in particular to a backscatter imaging device, a control method and an inspection system.

BACKGROUND

In some related arts of X-ray backscatter imaging, an object to be inspected is irradiated using a pencil X-ray beam, to image by detecting backscattered photons of the object. The scatter image is formed by ray signals scattered by the part of the object to be inspected at a depth close to the detector.

Since rays in low atomic number substances such as explosives and drugs have stronger Compton scattering, the backscatter imaging system may distinguish materials and highlight organic substances. As the ray source and the detector of the backscatter imaging system are on the same side of the object to be inspected, the backscatter imaging system has the characteristics of favorable concealability and sensitivity to drugs and explosives. Particularly in the case where transmission cannot be realized by placing a detector on the other side of the object to be inspected (for example, inspecting a wall or a downhole environment), the backscatter imaging system has significant advantages.

SUMMARY

In one embodiment of the present disclosure, a backscatter imaging device is provided. The device includes: a ray source assembly configured to emit rays to a scanning area; a backscatter detector array including a plurality of backscattering detectors and configured to receive scattered photons when the rays are backscattered by an object within the scanning area; and a first collimator assembly including a plurality of first collimating channels corresponding to the plurality of backscatter detectors respectively, arranged on one side of the backscatter detector array adjacent to the scanning area, and configured to align the scattered photons when the rays are backscattered by the object, and the plurality of backscatter detectors receive scattered photons corresponding to a plurality of depths in the object respectively; and at least part of the plurality of first collimation channels have an adjustable collimation angle.

In some embodiments, the backscatter imaging device further includes: a controller in signal connection with the first collimator assembly and configured to adjust a collimation angle of at least part of the plurality of first collimating channels by sending an instruction to the first collimator assembly to realize switching of at least two scanning modes, and the at least two scanning modes include a first scanning mode and a second scanning mode, the first collimator assembly is configured to cause the plurality of backscatter detectors to receive scattered photons corresponding to the plurality of depths in the object respectively in the first scanning mode, and cause the plurality of backscatter detectors receive scattered photons corresponding to the same depth in the object in the second scanning mode.

In some embodiments, the first collimator assembly includes a plurality of restraining plates, respective adjacent restraining plates among the plurality of restraining plates form a plurality of first collimating channels for the scattered photons to pass through and arrive at the plurality of backscattering detectors respectively, and at least part of the plurality of restraining plates are rotatable relative to the backscatter detector array to realize adjustment of a collimation angle.

In some embodiments, the plurality of restraining plates are configured to be parallel to each other in the first scanning mode, and have extension planes intersecting on the same straight line in the second scanning mode.

In some embodiments, the ray source assembly includes: a distributed ray source including a plurality of emitting targets distributed at various heights; and a second collimator assembly arranged at one side of the distributed ray source adjacent to the scanning area, and configured to align rays emitted from each of the plurality of emitting targets into a pencil beam.

In some embodiments, the backscatter imaging device further includes: a controller in signal connection with the distributed ray source, and configured to send an instruction to the distributed ray source and the plurality of emitting targets are turned on and off in a cycle to realize emission of pencil beams at a plurality of heights, or and a specified emitting target among the plurality of emitting targets is turned on to realize emission of a pencil beam at a predetermined height.

In some embodiments, the second collimator assembly has a plurality of grids in one-to-one correspondence with the plurality of emitting targets, each grid forms a second collimating channel that aligns the ray emitted from a corresponding emitting target into a pencil beam, and distances between ray entering ends of the plurality of grids and corresponding emitting targets are less than or equal to a first threshold value of 50-100 mm.

In some embodiments, the second collimator assembly has a plurality of grids in one-to-one correspondence with the plurality of emitting targets, each grid forms a second collimating channel that aligns the ray emitted from a corresponding emitting target into a pencil beam, and the backscatter imaging device further includes a controller in signal connection with the second collimator assembly and configured to send an instruction to the second collimator assembly and the plurality of grids are opened and closed in a cycle to realize emission of the pencil beam at a plurality of heights, or and a specified grid among the plurality of grids is opened to realize emission of the pencil beam at a predetermined height.

In some embodiments, the backscatter detector array is in signal connection with the controller, and the backscatter detector array is configured to rotate by a corresponding angle according to a control instruction received from the controller.

In one embodiment of the present disclosure, a control method of a backscatter imaging device is provided. The method includes: causing a ray source assembly to emit rays to a scanning area; adjusting a collimation angle of at least part of a plurality of first collimating channels in a first collimator assembly when an object enters the scanning area and moves relative to the scanning area, and a plurality of backscattering detectors in a backscatter detector array receive scattered photons corresponding to corresponding depths in the object respectively, thereby realizing scan imaging of at least one scanning section in the object.

In some embodiments, the step of adjusting a collimation angle includes: adjusting the collimation angle of at least part of the plurality of first collimating channels in a first scanning mode, and the plurality of backscattering detectors receive scattered photons corresponding to a plurality of depths in the object respectively; switching to a second scanning mode when an instruction for enhanced imaging of a specified area within the object is received, and the collimation angle of at least part of the plurality of first collimating channels is adjusted in the second scanning mode, and the plurality of backscattering detectors receive scattered photons corresponding to the same depth of the specified area in the object.

In some embodiments, the control method further includes: selecting a plurality of different depths of the specified area in the object in the second scanning mode, and for each depth among the plurality of different depths, adjusting the collimation angle of at least part of the plurality of first collimating channels, and the plurality of backscattering detectors receive scattered photons at this depth.

In some embodiments, the ray source assembly includes a distributed ray source and a second collimator assembly, and the distributed ray source includes a plurality of emitting targets distributed at various heights, and the second collimator assembly is arranged on one side of the distributed ray source adjacent to the scanning area and configured to align the rays emitted from each of the plurality of emitting targets into a pencil beam; the control method further includes: sending an instruction to the distributed ray source and the plurality of emitting targets are turned on and off in a cycle in the first scanning mode to realize scanning in the object by the pencil beam at a specified height range; turning on a specified emitting target among the plurality of emitting targets in the second scanning mode, to realize scanning of the specified area in the object by the pencil beam at a specified height.

In some embodiments, the ray source assembly includes a distributed ray source and a second collimator assembly, and the distributed ray source includes a plurality of emitting targets distributed at various heights, and the second collimator assembly is arranged on one side of the distributed ray source adjacent to the scanning area and has a plurality of grids in one-to-one correspondence with the plurality of emitting targets, each grid forms a second collimating channel that aligns the ray emitted from a corresponding emitting target into a pencil beam; the control method includes: sending an instruction to the second collimator assembly and the plurality of grids are opened and closed in a cycle in the first scanning mode, to realize scanning of the object by the pencil beam at a plurality of heights; opening a specified grid among the plurality of grids in the second scanning mode, to realize scanning of the specified area in the object by the pencil beam at a specified height.

In some embodiments, the control method further includes: causing the object to discontinuously or continuously move relative to the ray source assembly and the backscatter detector array, to realize scan imaging of a plurality of scanning cross sections successively in the object.

In one embodiment of the present disclosure, an inspection system is provided. The system includes: the backscatter imaging device described above.

BRIEF DESCRIPTION OF THE DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which:

FIG. 7 is a schematic view of opened and closed states of each grid in the second collimator assembly at various heights in some embodiments of the backscatter imaging device according to the present disclosure;

FIG. 8 is a schematic view when each grid in the second collimator assembly is opened in some embodiments of the backscatter imaging device according to the present disclosure;

FIG. 9 is a flowchart in some embodiments of the control method of a backscatter imaging device according to the present disclosure.

Figure 1:
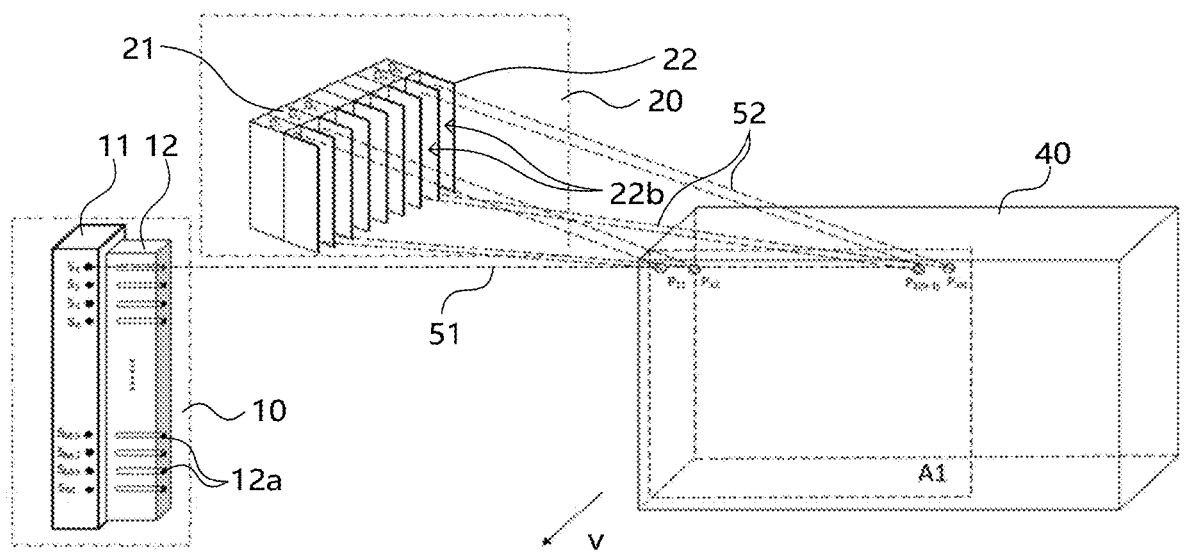
FIG. 1 is a schematic view of the operation principles in a first scanning mode in some embodiments of the backscatter imaging device according to the present disclosure.

It should be understood that the dimensions of various parts shown in the accompanying drawings are not drawn according to actual proportional relations. In addition, the same or similar components are denoted by the same or similar reference signs.

DETAILED DESCRIPTION OF THE DISCLOSURE

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to discern between different parts. A word such as "comprise", "have" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and in one embodiment, there may be no intermediate device. When it is described that a particular device is connected to other devices, the particular device may be directly connected to said other devices without an intermediate device, and in one embodiment, may not be directly connected to said other devices but with an intermediate device.

All the terms (including technical and scientific terms) used in the present disclosure have the same meanings as understood in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known in the relevant art may not be discussed in detail, but where appropriate, these techniques, methods, and apparatuses should be considered as part of this specification.

In some related arts, the backscatter imaging system has poor adaptability, and it is difficult to adapt to different detection environments and detection objects.

In view of this, the embodiments of the present disclosure provide a backscatter imaging system, which may improve the operation adaptability of the backscatter imaging system.

Figure 2:
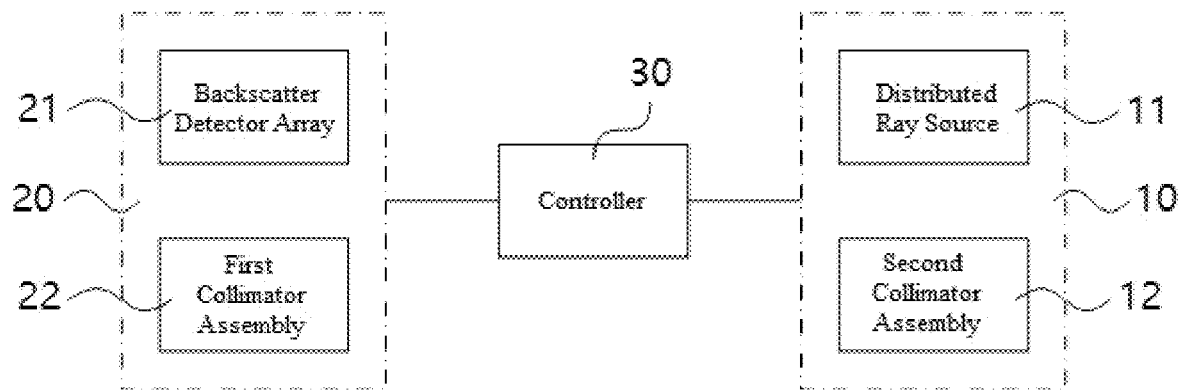
FIG. 2 is a schematic block view in some embodiments of the backscatter imaging device according to the present disclosure.

FIG. 1 is a schematic view of the operation principles in a first scanning mode in some embodiments of the backscatter imaging device according to the present disclosure. FIG. 2 is a schematic block view in some embodiments of the backscatter imaging device according to the present disclosure.

Referring to FIGS. 1 and 2, in some embodiments, the backscatter imaging device includes a ray source assembly 10 and a detector assembly 20. The ray source assembly 10 is capable of emitting rays to a scanning area. The area covered by one or more pencil or fan-shaped ray beams emitted by the ray source assembly 10 is the scanning area. The detector assembly 20 is capable of receiving scattered photons 52 when the rays emitted by the ray source assembly 10 are backscattered on the surface or inside of the object to be inspected. In some embodiments, the backscatter imaging device may further include a carrier platform for carrying and fixing the ray source assembly 10 and the detector assembly 20. The carrier platform may move relative to the object to realize the relative movements between the object and the ray source assembly, and between the object and the detector assembly.

Referring to FIG. 1, the detector assembly 20 may include a backscatter detector array 21 and a first collimator assembly 22. The backscatter detector array 21 may include a plurality of backscatter detectors $D_1, D_2, D_3, \ldots, D_{N-1}, D_N$, and is configured to receive scattered photons 52 when the rays are backscattered by an object 40 within the scanning area.

The first collimator assembly 22 may include a plurality of first collimating channels 22b corresponding to the plurality of backscatter detectors $D_1, D_2, D_3, \ldots, D_{N-1}, D_N$ respectively, and is arranged on one side of the backscatter detector array 21 adjacent to the scanning area, and configured to align the scattered photons 52 when the rays are backscattered by the object 40, and the plurality of backscatter detectors $D_1, D_2, D_3, \ldots, D_{N-1}, D_N$ receive scattered photons 52 corresponding to specified depths in the object 40.

In FIG. 1, when the rays emitted by the ray source assembly 10 enters the object 40 at a depth, the rays may be backscattered by a plurality of positions $P_{11}, P_{12}, P_{1(N-1)}, P_{1N}$ inside the object 40 corresponding to different depths. In one embodiment, a plurality of first collimating channels 22b formed by the first collimator assembly 22 may cause the plurality of backscattering detectors $D_1, D_2, D_3, \ldots, D_{N-1}, D_N$ to receive scattered photons 52 in the object 40 at each depth respectively.

A fan-shaped scattered photon receiving area (referring to a fan-shaped area enclosed by two broken lines 52 connecting each of $P_{11}, P_{12}, \ldots, P_{1(N-1)}, P_{1N}$ to an upper and lower end of the first collimating channel 22b respectively in FIG. 1) may be formed from each position $P_{11}, P_{12}, \ldots, P_{1(N-1)}, P_{1N}$ in the object 40 to the first collimating channel 22b before a corresponding backscattering detector $D_1, D_2, D_3, \ldots, D_{N-1}, D_N$.

Although scattered photons in all directions may be generated by rays at different depths inside the object 40, for a plane formed by a point at a depth (for example, called as a reference point) inside the object and a corresponding first collimating channel 22b, since points at other depths inside the object 40 are not in such plane, it is difficult for scattered photons generated by these points at different depths to enter a first collimating channel 22b corresponding to the reference point. Therefore, only the scattered photons generated by the reference point may be received by a corresponding backscatter detector through the first collimating channel, to avoid that imaging is disturbed by scattered photons at other depths.

In some related arts, the detector cannot discern the scattered photons generated by the rays when entering the object at different depths and cannot obtain the depth detection information inside the object. In one embodiment, a first collimator assembly is provided on one side of the backscatter detector array adjacent to the scanning area, and the scattered photons at each corresponding depth may be received by defining an angle of each of the first collimating channels.

The material of the first collimator assembly may be selected from metals such as tungsten or lead, or other materials capable of isolating scattered photons such as alloy and non-metal. In some embodiments, at least part of the plurality of first collimation channels 22b have an adjustable collimation angle. In this way, a part of or all backscatter detectors in the backscatter detector array 21 may be controlled to receive scattered photons 52 at different angles.

Referring to FIG. 2, in some embodiments, the backscatter imaging device further includes a controller 30. The controller 30 is in signal connection with the first collimator assembly 22, and configured to adjust a collimation angle of at least part of the plurality of first collimating channels 22b by sending an instruction to the first collimator assembly 22, to realize the switching of at least two scanning modes.

In the present disclosure, the controller 30 may be implemented or performed using various general-purpose processors, Digital Signal Processors (DSP), Application Specific Integrated circuits (ASIC), Field Programmable Gate Arrays (FPGA) or other programmable logic devices, discrete gates or transistor logics, discrete hardware assemblies, or any combination of the above-described hardware forms capable of performing the functions described herein. The general-purpose processor may be a microprocessor, but in one embodiment, the processor may be any conventional processor, controller, microcontroller, or state machine. The processor may also be implemented as a combination of computing devices, for example a combination of a DSP and a microprocessor, a plurality of microprocessors, one or more microprocessors cooperating with a DSP core, or any other such configuration.

Figure 3:
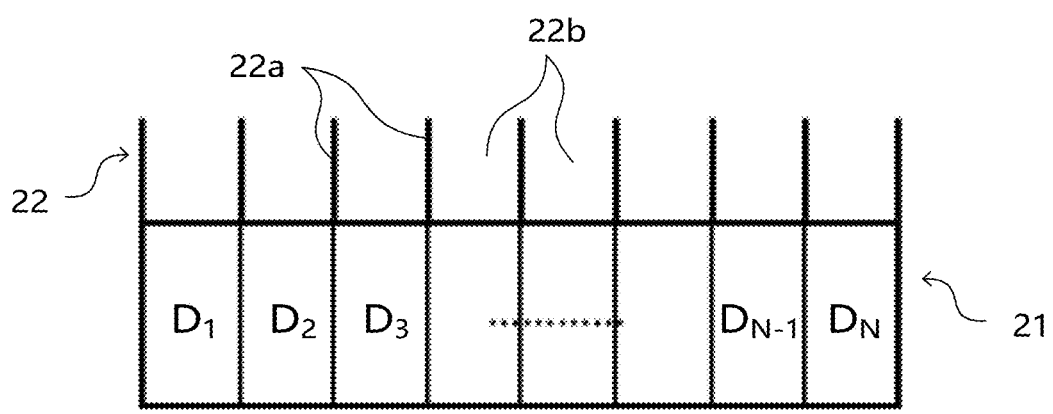
FIG. 3 is a schematic structural view of the detector assembly in a first scanning mode in some embodiments of the backscatter imaging device according to the present disclosure.

In some embodiments, at least two scanning modes include a first scanning mode and a second scanning mode. Referring to FIGS. 1 and 3, the first collimator assembly 22 may allow the plurality of backscatter detectors to receive scattered photons 52 corresponding to the plurality of specified depths in the object 40 respectively in the first scanning mode. In this mode, the backscatter imaging device may obtain scanning information in the object at a plurality of depths.

In FIG. 3, the first collimator assembly 22 includes a plurality of restraining plates 22a, and each adjacent restraining plate 22a among the plurality of restraining plates 22a forms a plurality of first collimating channels 22b for scattered photons 52 to pass through and arrive at the plurality of backscattering detectors $D_1, D_2, D_3, \ldots, D_{N-1}, D_N$ respectively. At least part of the plurality of restraining plates 22a may rotate relative to the backscatter detector array 21 to realize the adjustment of a collimation angle. In some embodiments, the plurality of restraining plates 22a are configured to be parallel to each other in the first scanning mode.

Figure 4:
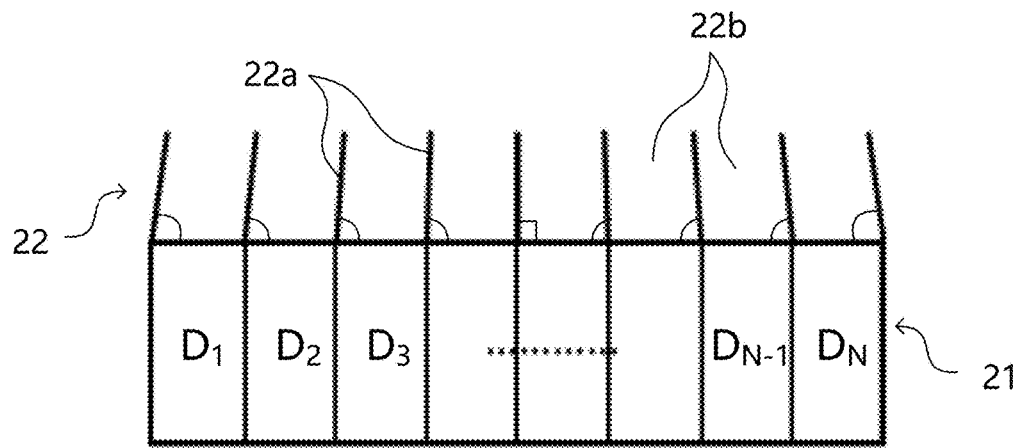
FIG. 4 is a schematic structural view of the detector assembly in a second scanning mode in some embodiments of the backscatter imaging device according to the present disclosure.
Figure 5:
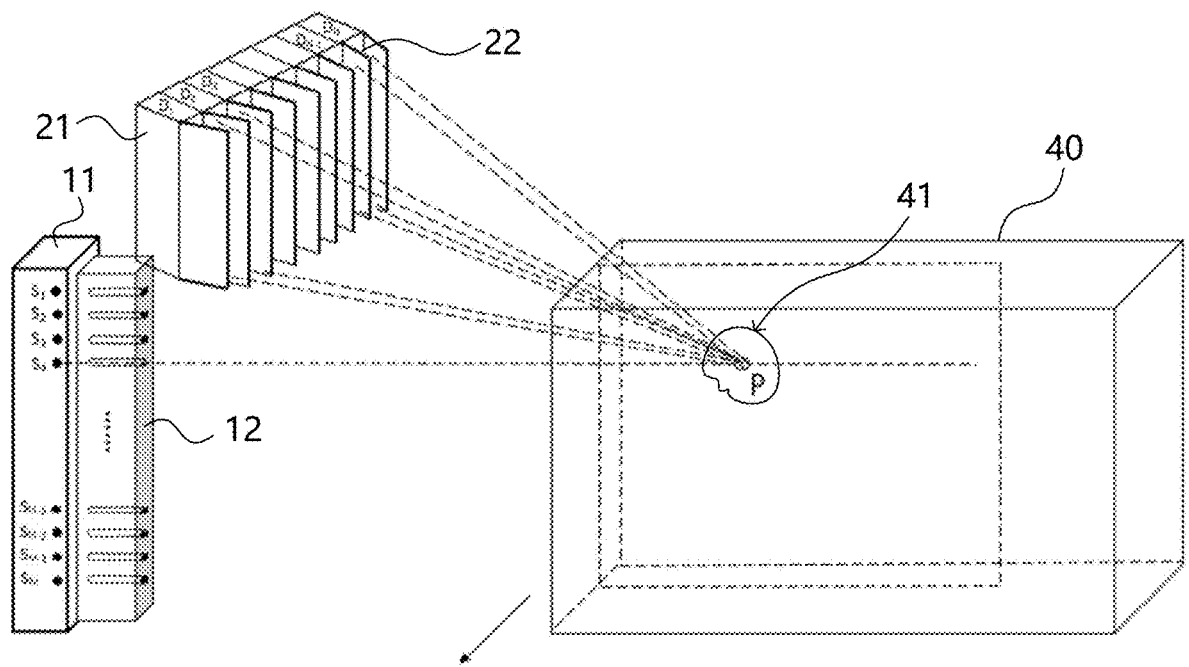
FIG. 5 is a schematic view of the operation principles in a second scanning mode in some embodiments of the backscatter imaging device according to the present disclosure.

Referring to FIGS. 4 and 5, the first collimator assembly 22 may cause the plurality of backscattering detectors $D_1, D_2, D_3, \ldots, D_{N-1}, D_N$ to all receive scattered photons 52 corresponding to the same specified depth in the object 40 in the second scanning mode. In FIGS. 4 and 5, the plurality of restraining plates 22a are configured to have extension planes intersecting on the same straight line in the second scanning mode.

On the basis of FIG. 3, when it is necessary to switch to the second scanning mode, the restraining plates 22a located on both sides in FIG. 4 are inclined toward the middle at a large angle, while the restraining plates 22a located in the middle are inclined at a small angle or not inclined, and each restraining plate 22a may intersect on the same straight line after outwardly extending.

In FIG. 5, the point P is located on the straight line where the extension surfaces of the plurality of restraining plates 22a intersect. In this way, the scattered photons 52 of the point P corresponding to the same specified depth may enter each backscattering detector, to realize enhancement of the detection effect. In this mode, the backscatter imaging device may perform enhanced detection on a suspected local part in the object.

For the backscatter imaging device, when an object is scanned, normal scanning may be performed applying the first scanning mode, and when a suspected part in the object is found, the controller sends instructions to the first collimator group to adjust a collimation angle of at least part of the first collimating channels, to realize the switching from the first scanning mode to the second scanning mode.

Since the suspected part might have a volume, in the second scanning mode, it is possible to adjust a collimation angle of at least part of the first collimation channels several times to realize enhanced scanning of a plurality of points in the specified area after the specified area where enhanced scanning is desired is determined.

In the above-described embodiments, the detector assembly 20 and the ray source assembly 10 may be located on the same side of the object 40 relative to the object 40. In one embodiment, the detector assembly 20 may be arranged on one side or both sides of the ray source assembly 10. In some embodiments, the backscatter detector array 21 in the detector assembly 20 may rotate, for example, in the z axis perpendicular to a horizontal plane, to receive scattered photons at different angles. The backscatter detector array 21 may be in signal connection with the controller 30, to rotate by a corresponding angle according to a control instruction received from the controller 30.

Referring to FIGS. 1 and 2, in some embodiments, the ray source assembly 10 includes a distributed ray source 11 and a second collimator assembly 12. The distributed ray source 11 has a plurality of emitting targets $S_1, S_2, S_3, S_4, \ldots, S_{M-3}, S_{M-2}, S_{M-1}, S_M$ distributed at various heights. In some embodiments, the distributed ray source 11 may be configured to generate X-rays. In other embodiments, the distributed ray source may be configured to generate other rays, such as γ rays.

Here, the number M of emitting targets in the distributed ray source 11 may be equal to or different from the number N of a plurality of backscatter detectors in the aforementioned backscatter detector array 21. In some embodiments, each of the plurality of emitting targets of the distributed ray source 11 is in the same straight line which is perpendicular to the horizontal plane. In other embodiments, each of the plurality of emitting targets of the distributed ray source 11 may not be in the same straight line, or the same straight line may not be perpendicular to the horizontal plane.

The distributed ray source is a ray source which implements emitting rays at a plurality of physical positions, realize logic programming control and can be actuated rapidly through an electronic control system. In a tube, the emission characteristics of each emitter (an emitting target) are controlled using the electronic control system, to achieve the effect of radiating rays from different positions sequentially, and further implement scanning a section of the object.

The second collimator assembly 12 is arranged on one side of the distributed ray source 11 adjacent to the scanning area, and configured to align the rays emitted from each of the plurality of emitting targets into a pencil beam 51. Since a plurality of emitting targets are distributed at various heights, when different emitting targets cooperate with the second collimator assembly 12 to emit the pencil beam 51, it is possible to realize that the pencil beam 51 are emitted in a cycle at various heights, to achieve the effect of scanning a section inside the object. With the relative movement of the object and the ray source assembly 10, the ray source assembly 10 may realize scanning in the object at a spatial range.

In some embodiments, the switching time of the emitting target is in the order of 10 microseconds, while the beam emitting time of the emitting target is in the order of 10 microseconds to 100 microseconds. That is, the time interval of beam emitting sequentially between two adjacent emitting targets is in the order of 10 microseconds to 100 microseconds. When the pencil beams 51 are emitted in a cycle at various heights, the pencil beams with an extremely short time interval form scanning area of the ray source assembly of a full plane. When the object enters such scanning area and moves relative to the same, it is possible to implement that the ray source assembly discontinuously or continuously scan the object along a direction perpendicular to the beam plane formed by the pencil beams.

Compared with the solution of emitting rays at various heights using a flying spot device in some related arts, the distributed ray source 11 in the present embodiment may realize simultaneous control with the collection by the detector assembly by switching the plurality of emitting targets to accurately control the beam emission time, which may cause the signal collected by the detector assembly to be more accurately matched with the height of a backscattered point in the object. On the other hand, the emitting target in the present embodiment may be turned on or off as necessary, and it is possible to satisfy that a specified area in the object at a particular height is accurately positioned and scanned in the second scanning mode.

On the other hand, since the switching speed of the emitting target of the distributed ray source 11 according to the present embodiment is much greater than the relative movement speed (for example, 0.4 m/s) of the object and the backscatter imaging device, it is possible to scan each scanning section in the object very intricately during scanning. Here, the relative movement between the object and the backscatter imaging device may be that each member in the backscatter imaging device is stationary, while the object moves, and in one embodiment, the object remains stationary, while at least part members of the backscatter imaging device move (for example the ray source assembly 10 and the backscatter detector array 21).

In some embodiments, the controller 30 is in signal connection with the distributed ray source 11, and configured to allow that the plurality of emitting targets are turned on and off in a cycle by sending instructions to the distributed ray source 11, to realize the emission of the pencil beams 51 at a plurality of heights. For example, the controller 30 sends instructions to cause a plurality of emitting targets $S_1, S_2, S_3, S_4, \ldots, S_{M-3}, S_{M-2}, S_{M-1}, S_M$ to emit beams from top to bottom sequentially, and switch to the uppermost emitting target 51 after the lowermost emitting target SM emits a beam, and then repeat such cycling process until completed scanning of the object.

Figure 6:
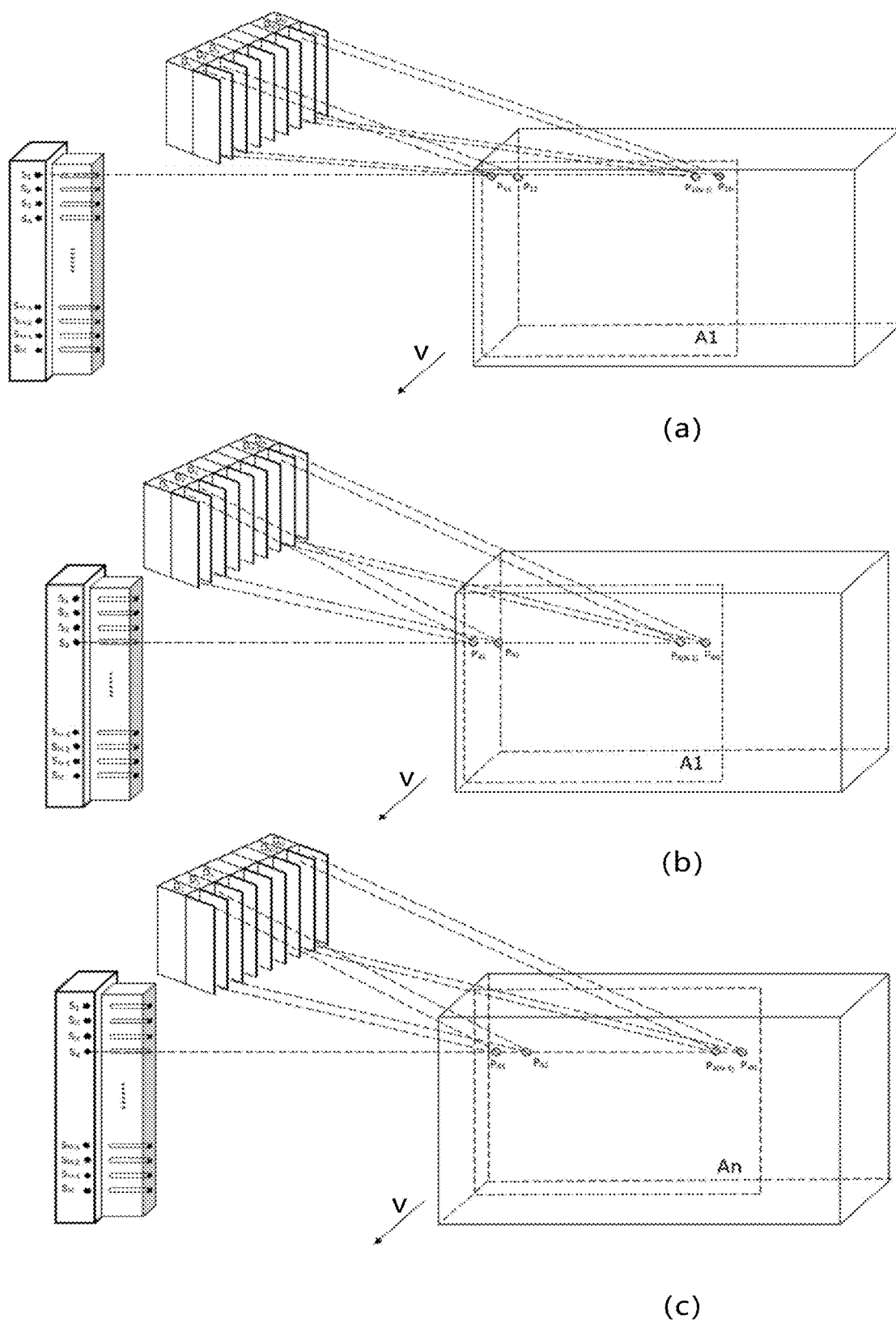
FIGS. 6(a) and 6(b) are schematic views of scanning the same scanning section from emitting targets at various heights in some embodiments of the backscatter imaging device according to the present disclosure respectively.
FIG. 6(c) is a schematic view of scanning another scanning section from the plurality of emitting targets in some embodiments of the backscatter imaging device according to the present disclosure.

Taking FIG. 6 as an example, the object moves relative to the distributed ray source 11 along a direction corresponding to the arrow v. In FIG. 6(a), immediately after the object enters the scanning area formed by the distributed ray source 11 and the second collimator assembly 12, the pencil beam emitting from the emitting target $S_1$ enters inside of the object along the scanning section A1 in the object. Scattered photons of the pencil beam backscattered by points $P_{11}, P_{12}, \ldots, P_{1(N-1)}, P_{1N}$ at a plurality of depths with a height of h1 in the scanning section A1 enter respective backscatter detectors $D_1, D_2, D_3, \ldots, D_{N-1}, D_N$ through a plurality of first collimating channels of the first collimator assembly 12 respectively.

Next, the plurality of emitting targets are sequentially switched downward along a height direction to emit the pencil beam. In FIG. 6(b), the pencil beam emitting from the emitting target $S_4$ still enters inside of the object along the scanning section A1 in the object. Scattered photons of the pencil beam backscattered at points $P_{41}, P_{42}, \ldots, P_{4(N-1)},$ $P_{4N}$ at a plurality of depths with a height of h4 in the scanning section $A_1$ enter respective backscatter detectors $D_1, D_2, D_3, \ldots, D_{N-1}, D_N$ through a plurality of first collimating channels of the first collimator assembly 12 respectively.

After the emitting targets are switched until the scanning section A1 is completely scanned at least once, the scanning of a plurality of scanning sections in the object is realized along with the relative movement of the object and the ray source assembly. In FIG. 6(c), the pencil beam emitting from the emitting target $S_4$ enters inside of the object along the scanning section An in the object. Here, the value range of n may be determined according to factors such as the relative movement speed between the object and the ray source assembly, the length of the object in a direction perpendicular to the scanning area, and the detection accuracy. Scattered photons of the pencil beam backscattered by points $P_{41}, P_{42}, \ldots, P_{4(N-1)}, P_{4N}$ at a plurality of depths with a height of $h_4$ in the scanning section An enter respective backscatter detectors $D_1, D_2, D_3, \ldots, D_{N-1}, D_N$ through a plurality of first collimating channels of the first collimator assembly 12 respectively.

In other embodiments, the controller 30 may also turn on a specified emitting target among the plurality of emitting targets, to implement emitting the pencil beam 51 at a predetermined height. Referring to FIG. 5, when it is necessary to perform enhanced scanning on the point P in the object 40, the controller 30 may designate the emitting target $S_4$ located at the same height as the point P to emit a beam.

Referring to FIGS. 1, 7 and 8, in some embodiments, the second collimator assembly 12 has a plurality of grids 12a in one-to-one correspondence with the plurality of emitting targets. Each grid 12a forms a second collimating channel that aligns the ray beam emitting from a corresponding emitting target into a pencil beam 51. The material of the second collimator assembly 12 may be selected from metals such as tungsten or lead, or other materials capable of isolating the ray beam such as alloy and non-metal.

In some embodiments, the ray beam emitted by each emitting target is a fan-shaped broad-beam. When one emitting target emits a beam, the beam can pass through the grid 12a in an opened state, while the beam cannot pass through the grid 12a in a closed state. In order to realize a section scanning effect of cycled beam emission along a height direction, referring to FIG. 7, in some embodiments, the controller 30 may cause the plurality of grids 12a to be opened and closed in a cycle by sending an instruction to the second collimator assembly 12, to realize emission of the pencil beams 51 at a plurality of heights. In this way, at the same moment, only one of the plurality of grids is in an opened state, and the other grids are in a closed state.

In FIG. 7, in the second collimator assembly 12 corresponding to the height $h_1$, the grid 12a corresponding to the emitting target $S_1$ is opened, and the other grids 12a are closed, and it is possible to realize emission of the pencil beam 51 at the height $h_1$. In the second collimator assembly 12 corresponding to the height $h_2$, the grid 12a corresponding to the emitting target $S_2$ is opened, and the other grids 12a are closed, and it is possible to realize emission of the pencil beam 51 at the height $h_2$. Similarly, the emission of the pencil beam 51 at each height may be realized sequentially.

When it is necessary to scan a point in a specified area in the object, the controller 30 may open the specified grid 12a among the plurality of grids 12a, to realize emission of the pencil beam 51 at a predetermined height. For example, in FIG. 5, the grid 12a corresponding to the emitting target $S_4$ remains open, and the other grids 12a remain closed, to realize enhanced scanning of the point P by the pencil beam 51 at the height $h_4$.

Referring to FIG. 8, in some embodiments, when the second collimator assembly 12 is proximate to the distributed ray source 11, for example, when the distance between the ray entering ends of the plurality of grids 12a and the corresponding emitting targets is less than or equal to the first threshold value of 50-100 mm, each grid may be in an opened state, and the ray beam emitted from each emitting target may not pass through an adjacent grid of its corresponding grid. In this way, it is possible to omit the control of each grid switch, and for the ray source assembly, compared with rapid switching of the grid switch, rapid switching of each emitting target in the distributed ray source is more easily realized, and it is possible to achieve a faster switching speed.

The above-described embodiments of the backscatter imaging device may be applied to various scenarios requiring backscatter imaging, for example security inspection of parcels or vehicles. Correspondingly, the present disclosure also provides an inspection system including any one of the aforementioned embodiments of the backscatter imaging device. The inspection system may be a security inspection system for performing security inspection of vehicles or cargos.

FIG. 9 shows a flowchart in some embodiments of the control method of a backscatter imaging device according to the present disclosure. Referring to FIG. 9, based on any one of the aforementioned embodiments of the backscatter imaging device, its control method may include step 100 and step 200. In step 100, the ray source assembly 10 is caused to emit rays to a scanning area. In step 200, when the object 40 enters the scanning area and moves relative to the scanning area, the collimation angle of at least part of the first collimating channels 22b in the first collimator assembly 22 is adjusted and the plurality of backscatter detectors in the backscatter detector array 21 receive scattered photons 52 corresponding to the specified depth in the object 40 respectively, to realize scan imaging of at least one scanning section in the object 40.

In some embodiments, the step of adjusting a collimation angle in step 200 may include: in the first scanning mode, the collimation angle of at least part of the plurality of first collimation channels 22b is adjusted and the plurality of backscattering detectors receive scattered photons 52 corresponding to a plurality of specified depths in the object 40 respectively.

When an instruction for enhanced imaging of a specified area in the object 40 is received, switching to the second scanning mode is performed. In the second scanning mode, the collimation angle of at least part of the first collimating channels 22b is adjusted and the plurality of backscattering detectors receive scattered photons 52 corresponding to the specified area 41 in the object 40 at the same specified depth.

In some embodiments, the control method may further include: selecting a plurality of different specified depths of the specified area 41 in the object 40 in the second scanning mode, and for each specified depth of the plurality of different specified depths, adjusting the collimation angle of at least part of the plurality of first collimating channels 22b and the plurality of backscattering detectors receive scattered photons 52 at the specified depth.

Referring to FIGS. 1 and 2, in some embodiments of the backscatter imaging device, the ray source assembly 10 includes a distributed ray source 11 and a second collimator assembly 12, and the distributed ray source 11 includes a plurality of emitting targets distributed at various heights, and the second collimator assembly 12 is arranged on one side of the distributed ray source 11 adjacent to the scanning area and configured to align the rays emitted from each of the plurality of emitting targets into a pencil beam 51.

Based on these embodiments of the backscatter imaging device, in some embodiments, the control method may further include: sending an instruction to the distributed ray source 11 and the plurality of emitting targets are turned on and off in a cycle in the first scanning mode to realize the scanning of the object 40 by the pencil beam 51 at a predetermined height range; turning on the specified emitting target among the plurality of emitting targets in the second scanning mode, to realize the scanning of the specified area 41 in the object 40 by the pencil beam 51 at a predetermined height.

In other embodiments, the control method may include: sending an instruction to the second collimator assembly 12 and the plurality of grids 12a are opened and closed in a cycle in the first scanning mode, to realize the scanning in the object 40 by the pencil beams 51 at a plurality of heights; opening the specified grid 12a among the plurality of grids 12a in the second scanning mode, to realize the scanning of the specified area 41 in the object 40 by the pencil beam 51 at a predetermined height.

In the embodiments of the control method described above, the control method may further include: causing the object 40 to discontinuously or continuously move relative to the ray source assembly 10 and the backscatter detector array 21, to realize the scan imaging of a plurality of scanning cross sections successively in the object 40.

Hereto, various embodiments of the present disclosure have been described in detail. Some details well known in the art are not described in order to avoid obscuring the concept of the present disclosure.

What is claimed is:

1. A backscatter imaging device, comprising:
a ray source assembly configured to emit rays to a scanning area;
a backscatter detector array comprising a plurality of backscattering detectors and configured to receive scattered photons when the rays are backscattered by an object within the scanning area; and
a first collimator assembly comprising a plurality of first collimating channels corresponding to the plurality of backscatter detectors respectively, arranged on one side of the backscatter detector array adjacent to the scanning area, and configured to align the scattered photons when the rays are backscattered by the object, wherein the plurality of backscatter detectors receive scattered photons corresponding to a plurality of depths in the object respectively;
wherein at least part of the plurality of first collimation channels have an adjustable collimation angle, and the backscatter imaging device further comprises a controller in signal connection with the first collimator assembly and configured to adjust a collimation angle of at least part of the plurality of first collimating channels by sending an instruction to the first collimator assembly configured to switch at least two scanning modes, wherein the at least two scanning modes comprise a first scanning mode and a second scanning mode, the first collimator assembly is configured to cause the plurality of backscatter detectors to receive scattered photons corresponding to the plurality of depths in the object respectively in the first scanning mode, and cause the plurality of backscatter detectors receive scattered photons corresponding to the same depth in the object in the second scanning mode.

2. The backscatter imaging device according to claim 1, wherein the first collimator assembly comprises a plurality of restraining plates, respective adjacent restraining plates among the plurality of restraining plates form a plurality of first collimating channels for the scattered photons to pass through and arrive at the plurality of backscattering detectors respectively, and at least part of the plurality of restraining plates are rotatable relative to the backscatter detector array to realize adjustment of a collimation angle.

3. The backscatter imaging device according to claim 2, wherein the plurality of restraining plates are configured to be parallel to each other in the first scanning mode, and have extension planes intersecting on the same straight line in the second scanning mode.

4. The backscatter imaging device according to claim 1, wherein the ray source assembly comprises:
 a distributed ray source comprising a plurality of emitting targets distributed at various heights; and
 a second collimator assembly arranged at one side of the distributed ray source adjacent to the scanning area, and configured to align rays emitted from each of the plurality of emitting targets into a pencil beam.

5. The backscatter imaging device according to claim 4, further comprising:
 a controller in signal connection with the distributed ray source, and configured to send an instruction to the distributed ray source wherein the plurality of emitting targets are turned on and off in a cycle to realize emission of pencil beams at a plurality of heights, or wherein a specified emitting target among the plurality of emitting targets is turned on to realize emission of a pencil beam at a predetermined height.

6. The backscatter imaging device according to claim 5, wherein the second collimator assembly has a plurality of grids in one-to-one correspondence with the plurality of emitting targets, each grid forms a second collimating channel that aligns the ray emitted from a corresponding emitting target into a pencil beam, and distances between ray entering ends of the plurality of grids and corresponding emitting targets are less than or equal to a first threshold value of 50-100 mm.

7. The backscatter imaging device according to claim 4, wherein the second collimator assembly has a plurality of grids in one-to-one correspondence with the plurality of emitting targets, each grid forms a second collimating channel that aligns the ray emitted from a corresponding emitting target into a pencil beam, and the backscatter imaging device further comprises a controller in signal connection with the second collimator assembly and configured to send an instruction to the second collimator assembly wherein the plurality of grids are opened and closed in a cycle to realize emission of the pencil beam at a plurality of heights, or wherein a specified grid among the plurality of grids is opened for emission of the pencil beam at a predetermined height.

8. The backscatter imaging device according to claim 1, wherein the backscatter detector array is in signal connection with the controller, and the backscatter detector array is configured to rotate by a corresponding angle according to a control instruction received from the controller.

9. A control method of a backscatter imaging device according to claim 1, comprising:
 causing a ray source assembly to emit rays to a scanning area;
 adjusting a collimation angle of at least part of a plurality of first collimating channels in a first collimator assembly when an object enters the scanning area and moves relative to the scanning area, wherein a plurality of backscattering detectors in a backscatter detector array receive scattered photons corresponding to corresponding depths in the object respectively, thereby realizing scan imaging of at least one scanning section in the object.

10. The control method according to claim 9, wherein the step of adjusting a collimation angle comprises:
 adjusting the collimation angle of at least part of the plurality of first collimating channels in a first scanning mode, wherein the plurality of backscattering detectors receive scattered photons corresponding to a plurality of depths in the object respectively;
 switching to a second scanning mode when an instruction for enhanced imaging of a specified area within the object is received, wherein the collimation angle of at least part of the plurality of first collimating channels is adjusted in the second scanning mode, wherein the plurality of backscattering detectors receive scattered photons corresponding to the same depth of the specified area in the object.

11. The control method according to claim 10, further comprising:
 selecting a plurality of different depths of the specified area in the object in the second scanning mode, and for each depth among the plurality of different depths, adjusting the collimation angle of at least part of the plurality of first collimating channels, wherein the plurality of backscattering detectors receive scattered photons at this depth.

12. The control method according to claim 10, wherein the ray source assembly comprises a distributed ray source and a second collimator assembly, wherein the distributed ray source comprises a plurality of emitting targets distributed at various heights, and the second collimator assembly is arranged on one side of the distributed ray source adjacent to the scanning area and configured to align the rays emitted from each of the plurality of emitting targets into a pencil beam; the control method further comprises:
 sending an instruction to the distributed ray source wherein the plurality of emitting targets are turned on and off in a cycle in the first scanning mode to realize scanning of the object by the pencil beam at a specified height range;
 turning on a specified emitting target among the plurality of emitting targets in the second scanning mode, configured to scan the specified area in the object by the pencil beam at a predetermined height.

13. The control method according to claim 10, wherein the ray source assembly comprises a distributed ray source and a second collimator assembly, wherein the distributed ray source comprises a plurality of emitting targets distributed at various heights, and the second collimator assembly is arranged on one side of the distributed ray source adjacent to the scanning area and has a plurality of grids in one-to-one correspondence with the plurality of emitting targets, each grid forms a second collimating channel that aligns the ray emitted from a corresponding emitting target into a pencil beam; the control method comprises:
 sending an instruction to the second collimator assembly wherein the plurality of grids are opened and closed in a cycle in the first scanning mode, configured to scan the object by the pencil beam at a plurality of heights;

opening a specified grid among the plurality of grids in the second scanning mode, configured to scan the specified area in the object by the pencil beam at a specified height.

14. The control method according to claim 9, further comprising:
causing the object to discontinuously or continuously move relative to the ray source assembly and the backscatter detector array, configured to scan imaging of a plurality of scanning cross sections successively in the object.

15. An inspection system comprising:
the backscatter imaging device according to claim 1.

* * * * *